US009106762B2

(12) United States Patent
Saint-Loubert-Bie

(10) Patent No.: US 9,106,762 B2
(45) Date of Patent: Aug. 11, 2015

(54) ASSOCIATING CONTENT WITH A GRAPHICAL INTERFACE WINDOW USING A FLING GESTURE

(75) Inventor: Emmanuel Rene Saint-Loubert-Bie, Redwood City, CA (US)

(73) Assignee: Google Inc., Mountain View, CA (US)

( * ) Notice: Subject to any disclaimer, the term of this patent is extended or adjusted under 35 U.S.C. 154(b) by 319 days.

(21) Appl. No.: 13/439,747

(22) Filed: Apr. 4, 2012

(65) Prior Publication Data

US 2013/0268873 A1 Oct. 10, 2013

(51) Int. Cl.
*G06F 3/048* (2013.01)
*H04M 1/725* (2006.01)
*G06F 3/0482* (2013.01)
*G06F 3/0488* (2013.01)
*G06F 3/041* (2006.01)
*G06F 3/0484* (2013.01)

(52) U.S. Cl.
CPC ......... *H04M 1/72561* (2013.01); *G06F 3/0482* (2013.01); *G06F 3/04883* (2013.01); *G06F 3/0416* (2013.01); *G06F 3/0488* (2013.01); *G06F 3/04842* (2013.01); *G06F 2203/04803* (2013.01); *G06F 2203/04808* (2013.01); *G10H 2220/096* (2013.01); *H04M 2250/22* (2013.01)

(58) Field of Classification Search
USPC .................................................. 715/764, 863
See application file for complete search history.

(56) References Cited

U.S. PATENT DOCUMENTS

| 7,921,372 B2* | 4/2011 | Sauve et al. .................... 715/767 |
| 8,214,768 B2* | 7/2012 | Boule et al. .................... 715/863 |
| 2007/0146347 A1 | 6/2007 | Rosenberg | |
| 2009/0066728 A1* | 3/2009 | Ording ......................... 345/652 |
| 2011/0078624 A1 | 3/2011 | Missig et al. | |

* cited by examiner

*Primary Examiner* — Boris Pesin
*Assistant Examiner* — Elizabeth G Wright
(74) *Attorney, Agent, or Firm* — McDermott Will & Emery LLP

(57) ABSTRACT

Computer-implemented methods for associating, based on a fling gesture, content with a graphical interface window, are provided. In one aspect, a method includes receiving, via a computing device, a fling gesture associated with an access point, wherein the fling gesture is a movement of the access point along a path from a first location on a display screen of the computing device to a second location on the display screen of the computing device, and wherein the access point is a reference to content. In response to the fling gesture, a graphical interface window is generated. The graphical interface window is then associated with the content referenced by the access point.

22 Claims, 8 Drawing Sheets

ASSOCIATING CONTENT WITH A GRAPHICAL INTERFACE WINDOW USING A FLING GESTURE

BACKGROUND

1. Field

The present disclosure generally relates to viewing content on a computing device, and more particularly to viewing content on a mobile computing device.

2. Description of the Related Art

Web pages often contain hyperlinks to other web pages that may also be of interest to a user. When a user comes across a hyperlink of interest, the user may desire to open a web page corresponding to the hyperlink. However, because leaving the current web page to view another web page would be inconvenient, the user may open the hyperlink in a new graphical interface window such as a new tabbed browser window (i.e. a browser tab) or a separate browser window (i.e. a browser window). Thus, the user may view the new web page at a later time without interrupting the current web browsing session.

Accessing content in the new graphical interface window typically involves using a secondary click, and then selecting an option to access the content in the new graphical interface window. This technique is intrusive because it requires several steps, and because it shifts the focus from the currently displayed content to the new graphical interface window. Furthermore, this technique is cumbersome to execute on touch-based interface such as a smartphone because these types of devices have smaller screens, and do not offer the same type of secondary click menus and options.

SUMMARY

According to one embodiment of the present disclosure, a computer-implemented method for generating a graphical interface window for viewing content in response to a fling gesture is provided. The method includes receiving, via a computing device, a fling gesture, wherein the fling gesture is a movement along a path from a first location on a display screen of the computing device on or near the access point to a second location on the display screen of the computing device away from the access point. In response to receiving the fling gesture, a graphical interface window is generated. The graphical interface window is then associated with the content referenced by the access point.

According to another embodiment of the present disclosure, a system for generating a graphical interface window for viewing content in response to a fling gesture is provided. The system includes a memory which has instructions for generating a graphical interface window for viewing content. The system further includes a processor configured to execute instructions for receiving, via a computing device, a fling gesture, wherein the fling gesture is a movement along a path from a first location on a display screen of the computing device on or near the access point to a second location on the display screen of the computing device away from the access point. In response to receiving the fling gesture, a graphical interface window is generated. The graphical interface window is associated with the content referenced by the access point. The content referenced by the access point is then provided for display within the graphical interface window.

According to a further embodiment of the present disclosure, a machine readable medium includes machine-readable instructions for causing a processor to execute a method for generating a graphical interface window for viewing content in response to a fling gesture. The method includes receiving, via a computing device, a fling gesture, wherein the fling gesture is a movement along a path from a first location on a display screen of the computing device on or near the access point to a second location on the display screen of the computing device away from the access point. The method further includes generating the graphical interface window off-screen, and adjacent to the edge of the display screen towards which the fling gesture was directed. Furthermore, the method includes associating the content referenced by the access point with the graphical interface window. The content referenced by the access point is then provided for display within the graphical interface window.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system and method provides for associating content with a graphical interface window based on a fling gesture. A fling gesture is a movement along a path on a display screen in a direction away from an access point. An access point can be a hyperlink, a pointer, an icon, a bookmark or a shortcut. The access point can reference content that can be a web page, a web-based application, an application, a program, a script, an applet, or an executable application. Upon receiving the fling gesture associated with the access point, a graphical interface window is generated. The graphical interface window can be generated off-screen or on-screen depending upon a user's preference. For example, a user may personalize the behavior of the fling gesture such that the graphical interface window is generated off-screen to keep the current browsing session from being interrupted. Similarly, a user may personalize the behavior of the fling gesture such that the graphical interface window is generated on-screen. The graphical interface window can be a tabbed window (i.e. a tab) or a separate window (i.e. a window) to display the content referenced by the access point. The content referenced by the access point is then provided for display within the graphical interface window.

For example, a user can apply the fling gesture to a link within a web page to create a new tab or window. The fling gesture can be used on any type of computing device, but is especially useful for devices having limited screen space, such as smartphones. Although web hyperlinks and web browsing windows are used as examples, the disclosed approach of using a fling gesture can be used with any type of access point.

Figure 1:
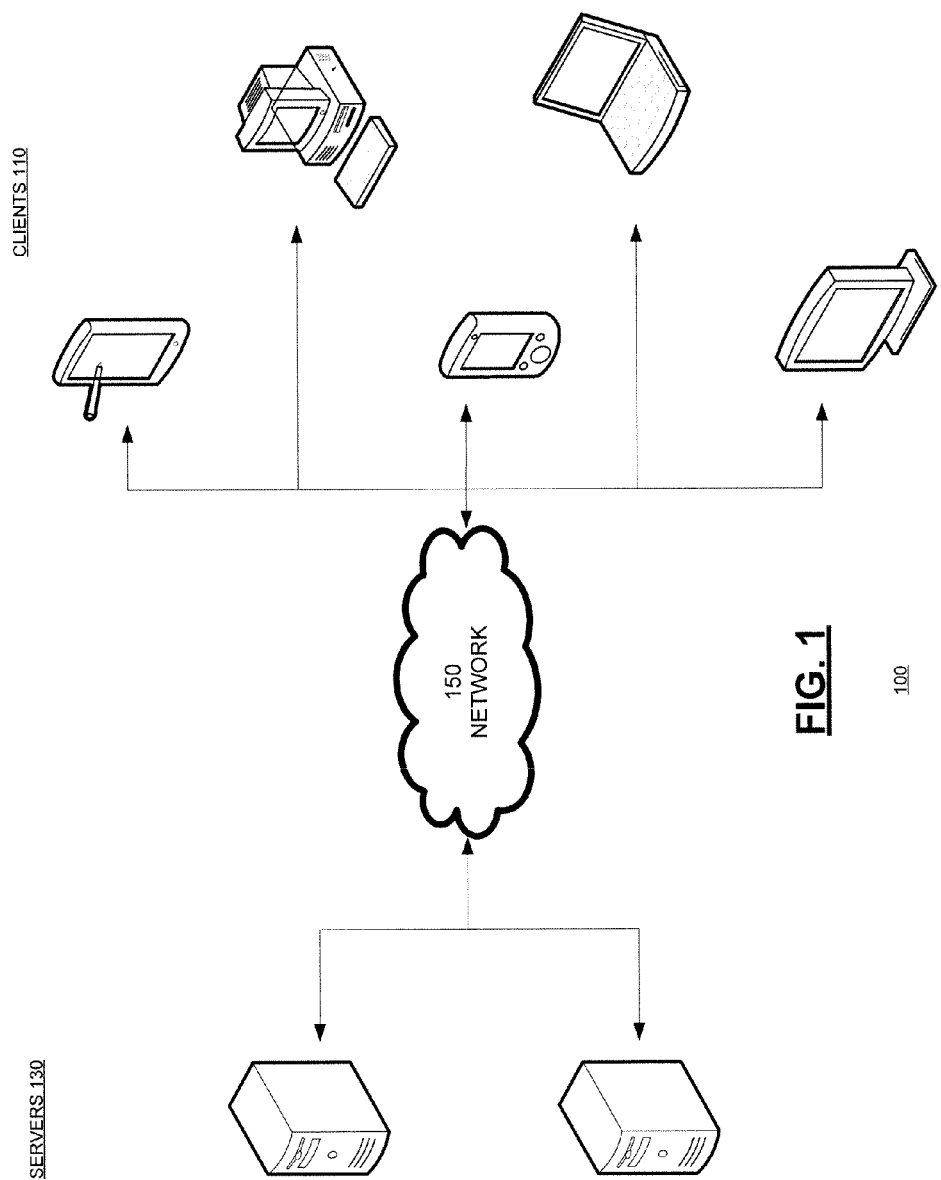
FIG. 1 illustrates an exemplary architecture for associating content with a graphical interface window based on a fling gesture.

FIG. 1 illustrates an exemplary architecture 100 for associating content with a graphical interface window based on a fling gesture. The architecture 100 includes servers 130 and clients 110 connected over a network 150.

The clients 110 can be, for example, desktop computers, mobile computers, tablet computers, mobile devices (e.g., a smartphone or PDA), set top boxes (e.g., for a television), video game consoles, or any other devices having appropriate processing capabilities, communications capabilities, and memory. Each client 110 is configured to include a graphical user interface that offers the ability to fling an access point. When a user is interacting with the client 110, the user can fling an access point to load the content referenced by the access point in a new graphical interface window. For example, if the user, while viewing a web page, comes across a hyperlink of interest, the user can fling the hyperlink to access the associated content in a new tab or window that is loaded off-screen for display.

The clients 110 can be connected to the network 150. The network 150 can include any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The fling gesture can be processed locally on the client 110. Alternatively, if the graphical user interface is hosted on, or downloaded from one of the many servers 130, the fling gesture can be processed by one of the many servers 130. For purposes of load balancing, multiple servers 130 can also host the data for downloading the graphical user interface, content, and/or for processing the fling gesture. In certain instances, different versions and/or configurations of the graphical user interface that include the features disclosed herein are available for download from a server 130 and subsequent installation depending on whether the client 130 is a mobile device or non-mobile device.

Figure 2:
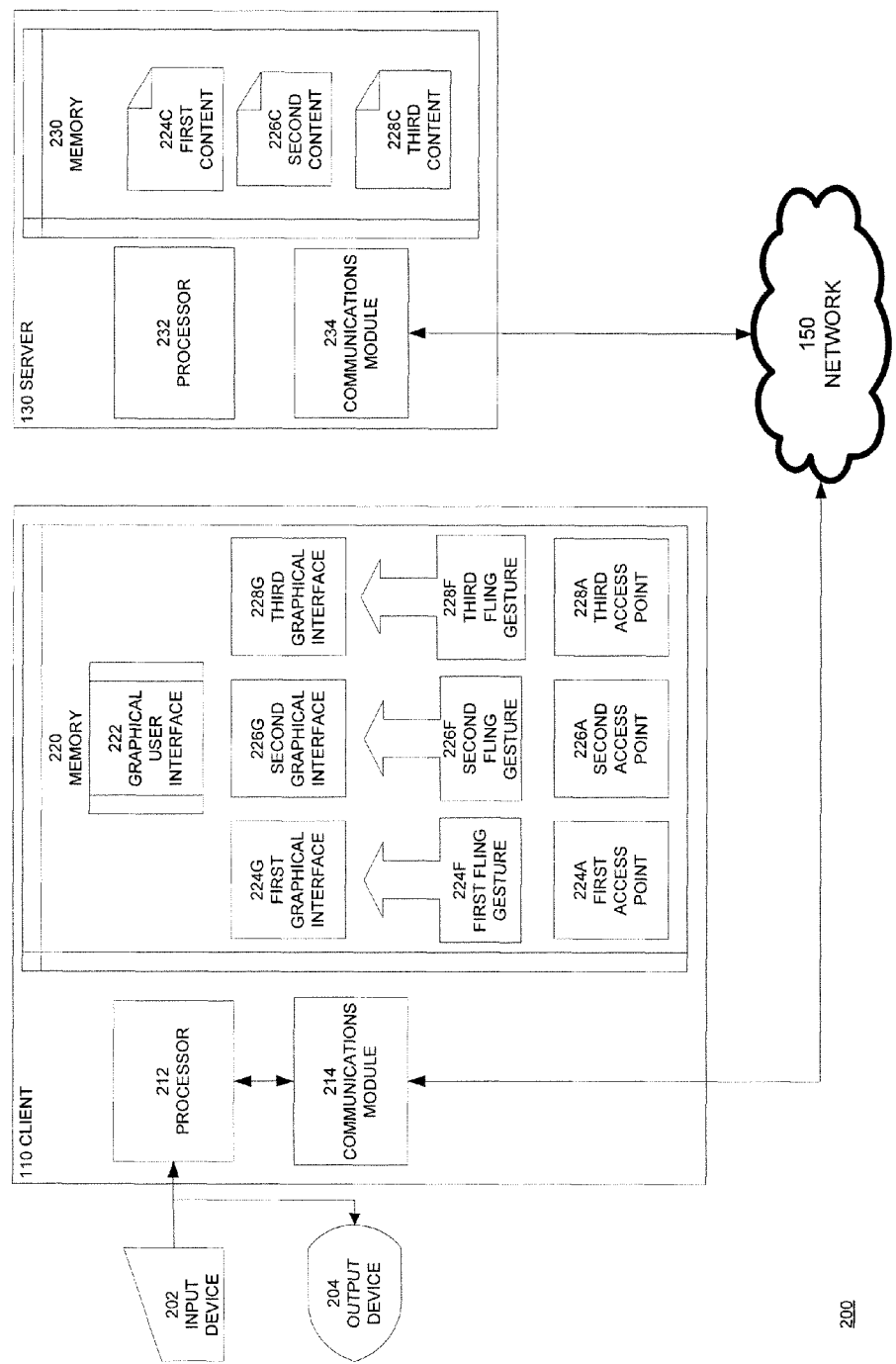
FIG. 2 is a block diagram illustrating an exemplary client from the architecture of FIG. 1 according to certain aspects of the disclosure.

FIG. 2 is a block diagram 200 illustrating an exemplary client 110 and an exemplary server 130 in the architecture 100 of FIG. 1 according to certain aspects of the disclosure. The server 130 includes a memory 230, a processor 232, and a communications module 234. The memory 230 includes, among other software instructions and data, a first content 224C, a second content 226C, and a third content 228C. The server 130 is connected to the network 150 via a communications module 234. The communications module 234 is configured to interface with the network 150 to send and receive information, such as data, requests, responses, and commands to other devices on the network 150. The communications module 234 can be, for example, a modem or Ethernet card.

The client 110 includes an input device 202, an output device 204, a processor 212, a communications module 214, and memory 220. The input device 202 can be a keyboard, touchscreen, or mouse, to receive user input. The output device 204 can be a display screen.

The client 110 is connected to the network 150 via a communications module 214. The communications module 214 is configured to interface with the network 150 to send and receive information, such as data, requests, responses, and commands to other devices on the network 150. The communications module 214 can be, for example, a modem or Ethernet card.

The memory 220 includes, among other software instructions and data, a graphical user interface 222 with access points 224A, 226A, and 228A that point to content 224C, 226C, and 228C respectively on the server 130. Based on receiving fling gestures 224F, 226F, and 228F, the content 224C, 226C, and 228C can be associated with graphical interface windows 224G, 226G, and 228G respectively. The content 224C, 226C, and 228C can then be provided for display within the graphical interface windows 224G, 226G, and 228G respectively of the graphical user interface 222.

The graphical user interface 222 can be, for example, a web browser, a software application, or an operating system. When the graphical user interface 222 is a web browser, then access points 224A, 226A, and 228A can be hyperlinks to three web sources with content 224C, 226C, and 228C respectively. The web sources can be web pages, web applications, applets, or scripts. The content 224C, 226C, and 228C can be provided for display in the web browser's 222 tabs or windows 224G, 226G, and 228G. When the graphical user interface 222 is an operating system, then access points 224A, 226A, and 228A can be links to three data or executable files 224C, 226C, and 228C. The data files can be, for example, documents or media files. The executable files can be, for example, applications, programs, scripts, applets, or stand-alone executable files. The applications can be, for example, an address book, a phone dialer, a media player, a document editor, or a web browser. Based on receiving fling gestures 224F, 226F, and 228F, the data or executable files can be provided for display in their respective graphical interface windows 224G, 226G, and 228G.

The processor 212 of the client 110 is configured to execute instructions, such as instructions physically coded into the processor 212, instructions received from software in memory 220, or a combination of both. As an example, the processor 212 of the client 110 executes instructions for associating the content 224C with a graphical interface window 224G, based on a fling gesture 224F.

The processor 212 is configured to receive, via the client 110 (e.g., through the graphical user interface 222), a fling gesture (e.g., 224F) associated with an access point (e.g., 224A). The fling gesture (e.g., 224F) is a movement of the access point (e.g., 224A) along a path from a first location on the display screen 204 to a second location on the display screen 204. Upon receiving the fling gesture (e.g., 224F) associated with the access point (e.g., 224A), the processor 212 is further configured to generate a graphical interface window (e.g., 224G) and associate the graphical interface window (e.g., 224G) with content (e.g., 224C) referenced by the access point (e.g., 224A).

Figure 3:
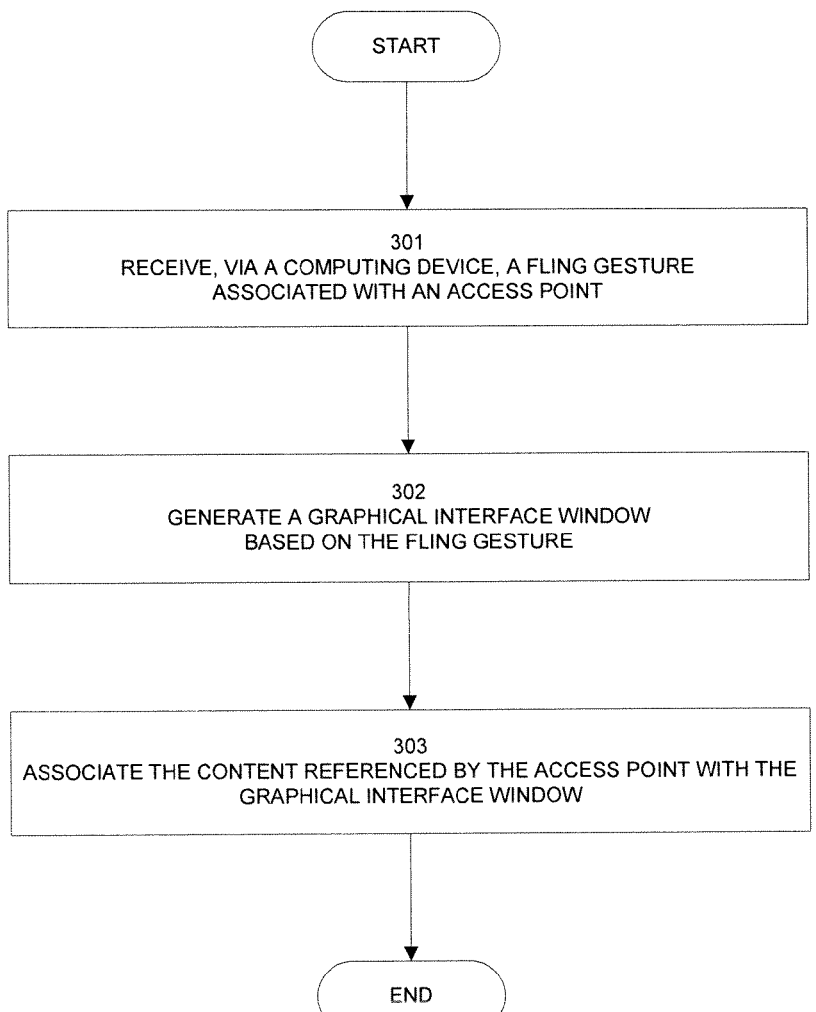
FIG. 3 illustrates an exemplary process for associating content with a graphical interface window based on a fling gesture, using an exemplary client of FIG. 2.

FIG. 3 illustrates an exemplary process 300 for associating a graphical interface window 224G with content 224C based on a fling gesture 224F, using the exemplary client 110 of FIG. 2. In step 301, a fling gesture 224F associated with an access point 224A is received via a computing device 110. In step 302, upon receiving the fling gesture 224F, a graphical interface window 224G is generated (e.g., by the processor 212). The graphical interface window 224G may or may not be immediately displayed within the graphical user interface 222. In step 303, the content 224C referenced by the access point 224A is associated (e.g., by the processor 212) with the graphical interface 224G. The process 300 then ends.

An example will now be described using the exemplary process 300 of FIG. 3. In this example, a smartphone will be used as the client 110, a web browser will be used as the graphical user interface 222, a hyperlink will be used as an access point 224A, a web page will be used as the content 224C, and a tabbed web browser window (i.e. a "web browser tab") will be used as a graphical interface window 224G.

Figure 4A:
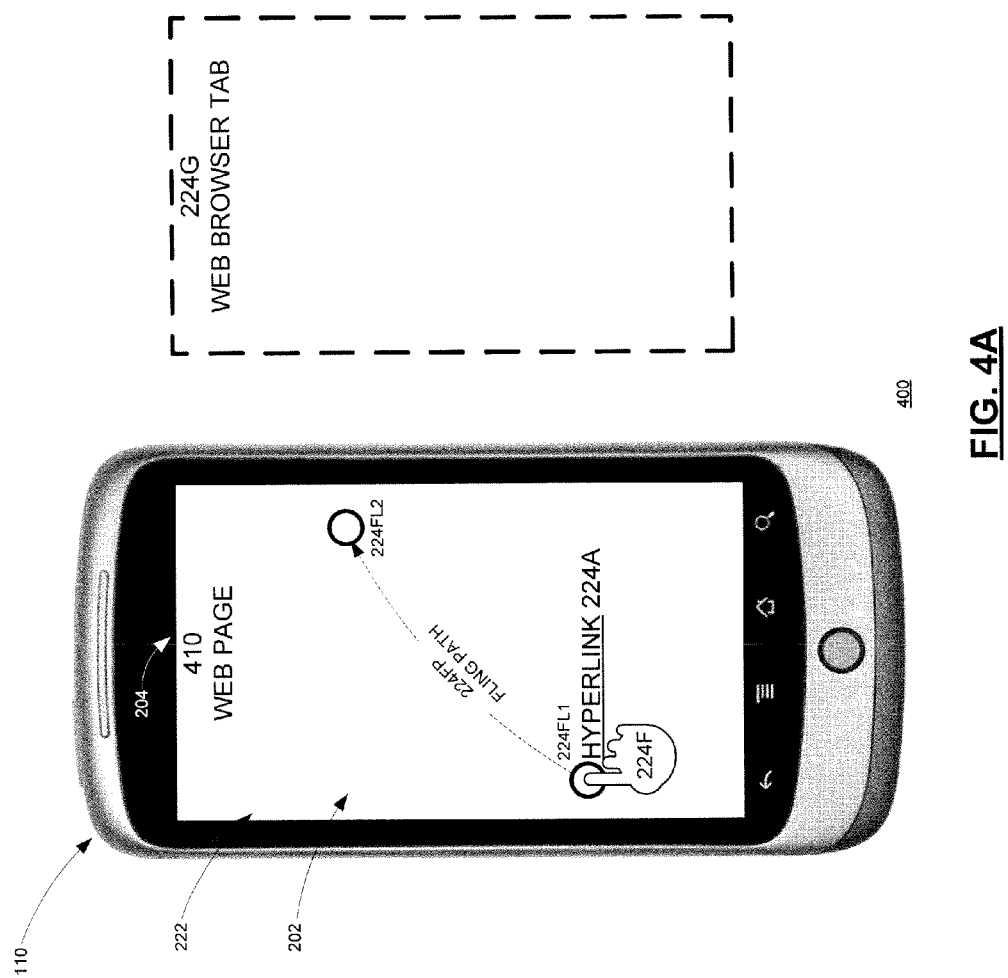
FIGS. 4A-4D are exemplary screenshots associated with the exemplary process of FIG. 3, and exemplary fling and swipe gestures.

The process 300 begins when a user loads a web browser 222 on the user's smartphone 110. FIG. 4A is an exemplary screenshot 400 of a smartphone 110 with a web browser 222 displaying a web page 410. The smartphone 110 in this example has a screen that serves as both as an input touchscreen 202, and as an output display screen 204. The web page 410 contains, among other web page elements, a hyperlink 224A that points to another web page 224C.

In step 301, while viewing the web page 410, the user can apply a fling gesture 224F to the access point 224A. Specifically, the user can use the input touchscreen 202 to move along a fling path 224FP from a first location 224FL1 on or near the access point 224A on the output display screen 204 of the smartphone 110 to a second location 224FL2 away from the access point 224A on the output display screen 204 of the smartphone 110. The fling path 224FP may be linear or, as displayed in this example, may be non linear. In step 302, in response to receiving the fling gesture 224F, a web browser tab 224G is generated outside the output display screen 204. In step 303, the web browser tab 224G is associated with the web page 224C referenced by the hyperlink 224A. The process 300 then ends.

The web browser tab 224G is generated adjacent to the edge of the output display screen 204 in the direction of the fling path 224FP. The edge of the output display screen 204 may be angular (e.g., a corner), straight or flat (e.g., an edge), or rounded (e.g., a soft, rounded, or arced edge or corner). In this example, because the fling path 224FP was directed towards the right edge of the output display screen 204, the web browser tab 224G is generated adjacent to the right edge of the output display screen 204. Once the web browser tab 224G has been generated and associated with the web page 224C referenced by the hyperlink 224A, the content of the web page 224C may be provided for display in the web browser tab 224G.

The behavior of the fling gesture 224F can be customized. For example, in FIG. 4A, the web browser tab 224G is generated off-screen. That is, the web browser tab 224G does not interrupt the current browsing session related to web page 410. However, the user may personalize the behavior of the fling gesture 224F such that the web browser tab 224G is generated on-screen. The user may customize the behavior of the fling gesture 224F using various points or areas on the output display screen 204. For example, the user may designate an edge of the output display screen 204 to launch the web browser tab on-screen. The inputs from the input device 202 may be used to customize the fling gesture 224F as well. For example, a press-and-hold gesture may be applied in advance of or in the beginning of the fling gesture 224F to launch the web browser tab on-screen. Or, as another example, a multi-touch gesture (e.g., multiple contact points on an input touchscreen 202) may be used to launch the web browser tab on-screen. That is, the fling gesture 224F may be executed using more than one contact point (e.g., two or more fingers) on the input touchscreen 202.

Figure 4B:
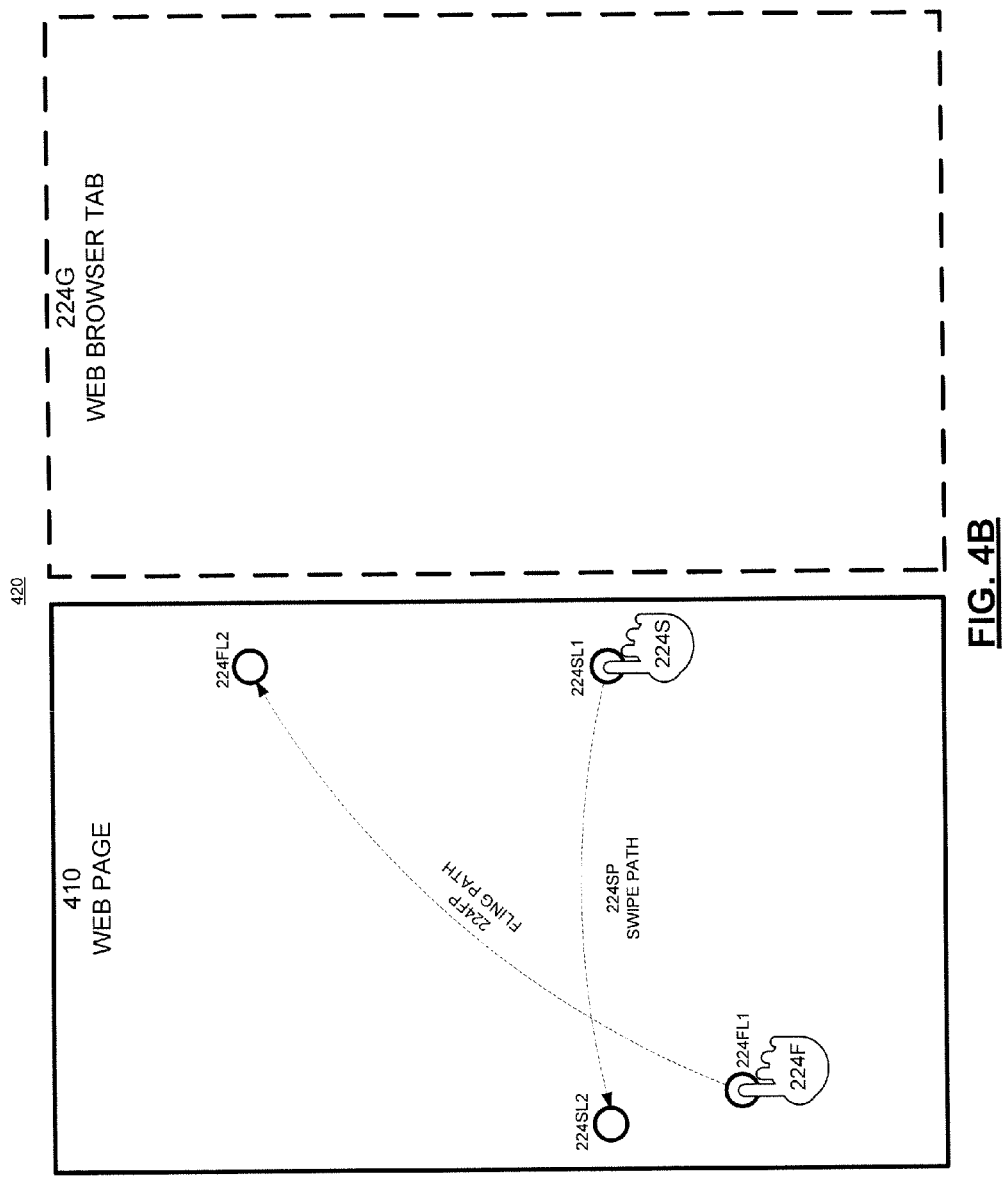

In the example illustrated in FIG. 4A, the web browser tab 224G is generated off-screen. The off-screen web browser tab 224G can be displayed on screen using a swipe gesture 224S. FIG. 4B is an exemplary screenshot 420 of a smartphone 110 with a web browser 222 displaying the web page 410. For context, the fling gesture 224F, and the corresponding fling path 224FP are also displayed in FIG. 4B.

In FIG. 4B, the swipe path 224SP of the swipe gesture 224S is a movement from a first swipe location 224SL1 to a second swipe location 224SL2. The swipe gesture 224S may be executed using an input device 202. In this example, the input device is an input touchscreen 202.

Figure 4C:
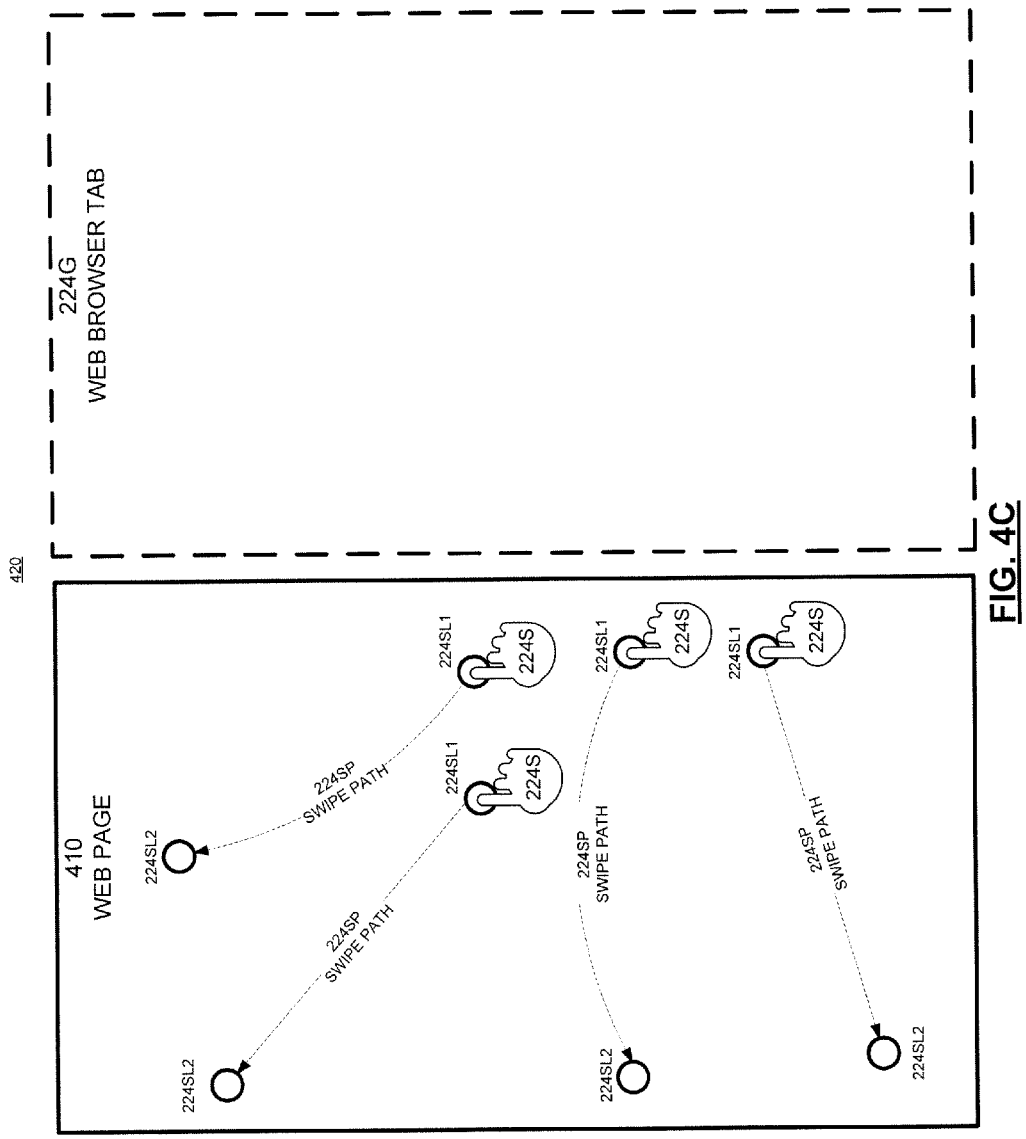

One way to define the swipe gesture 224S is in relation to an edge of the output display screen 204. With regard to an edge of the output display screen 204, the swipe gesture may be visualized as "pulling" the earlier generated web browser tab 224G on to the output display screen 204. That is, the swipe path 224SP is in a direction away from the edge where the off-screen web browser tab 224G is generated. As illustrated in FIG. 4C, the swipe path 224SP may or may not be perpendicular to the edge of the display. Furthermore, the swipe path 224SP may or may not be linear.

Figure 4D:
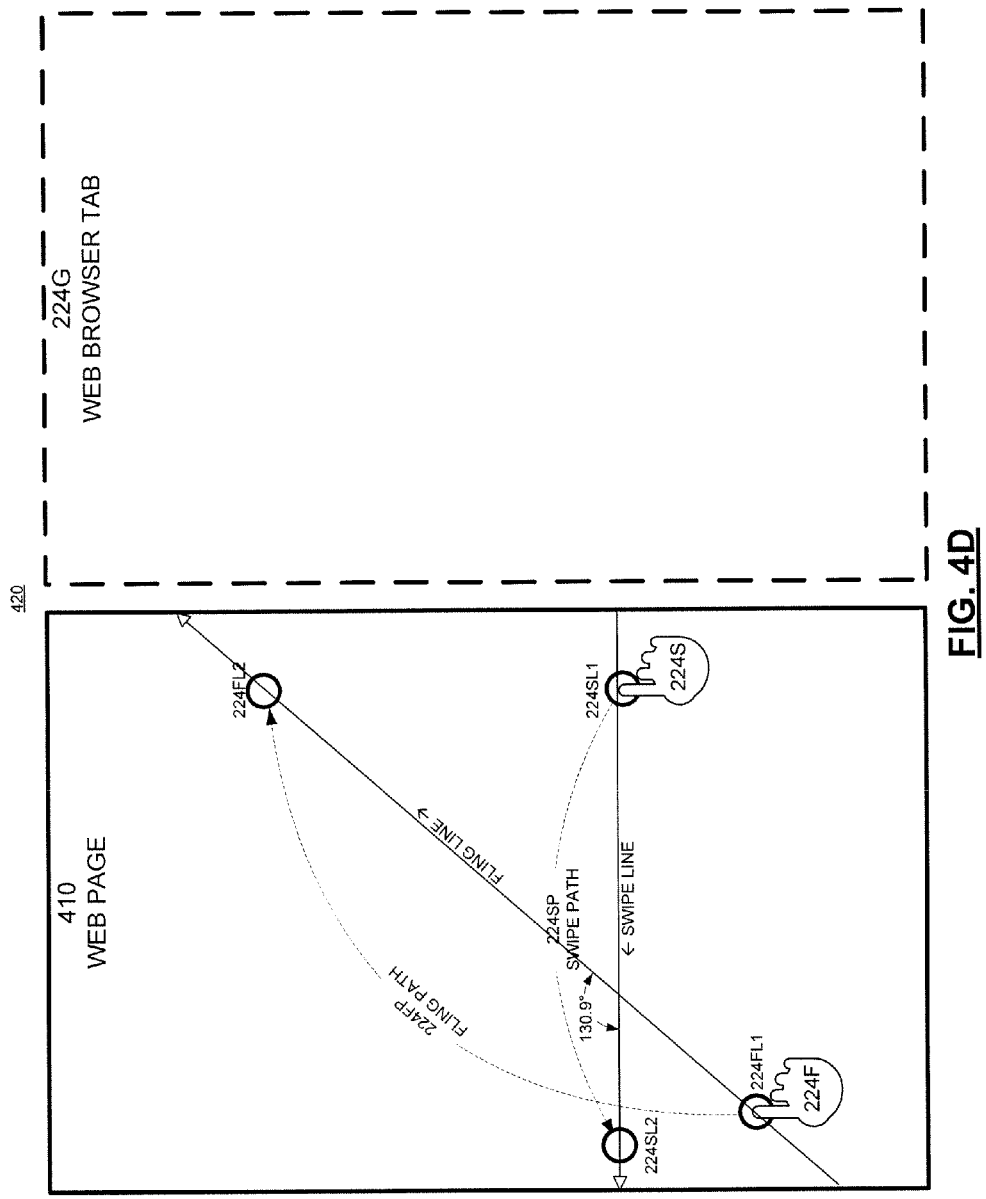

Another way to define the swipe gesture 224S is in relation to the fling gesture 224F. With regard to the fling gesture 224F, the swipe gesture 224S may be defined such that the angle between a straight line through the first location of the fling gesture 224FL1 and the second location of the fling gesture 224FL2, and a straight line through the first location of the swipe gesture 224SL1 and the second location of the swipe gesture 224SL2, is greater than 90 degrees. As illustrated in FIG. 4D, this angle is measured between (1) the second location of the fling path 224FL2, (2) the intersection point of a straight line through the first location of the fling gesture 224FL1 and the second location of the fling gesture 224FL2, and a straight line through the first location of the swipe gesture 224SL1 and the second location of the swipe gesture 224SL2, and (3) the second location of the swipe gesture 224SL2. In the example illustrated in FIG. 4D, this angle is 130.9 degrees.

Figure 5:
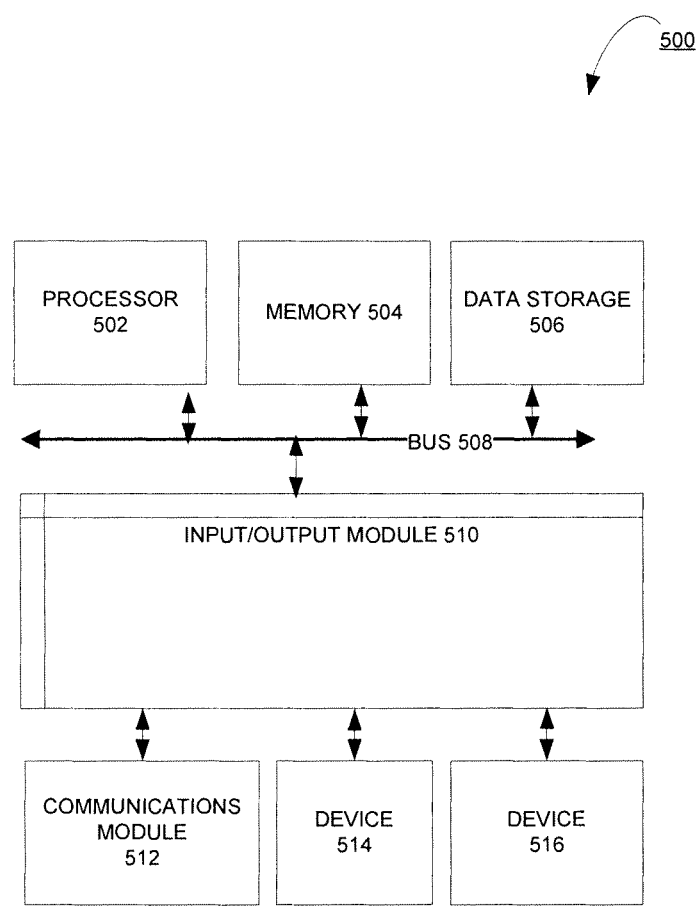
FIG. 5 is a block diagram illustrating an exemplary computer system with which the client of FIG. 2 can be implemented.

FIG. 5 is a block diagram illustrating an exemplary computer system 500 with which the client 110 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110) includes a bus 508 or other communication mechanism for communicating information, and a processor 502 (e.g., processor 212) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications module 214) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for generating a graphical interface window for viewing content, the method comprising:
    detecting a fling gesture performed on an access point, wherein the fling gesture comprises a movement along a path from a first fling location on a display screen of the computing device on the access point to a second fling location on the display screen of the computing device away from the access point, and wherein the access point is a link to content and comprises at least one of a hyperlink, a pointer, an icon, a bookmark, or a shortcut;
    generating, in response to the detected fling gesture, a graphical interface window off-screen; and
    loading, in response to the generating, the content linked to by the access point within the off-screen graphical interface window.

2. The computer-implemented method of claim 1, wherein the loading comprises:
    providing the content linked to by the access point for display within the off-screen graphical interface window.

3. The computer-implemented method of claim 1, wherein the path from the first fling location on the display screen of the computing device on the access point to the second fling location on the display screen of the computing device away from the access point is at least one of a linear path or a non-linear path.

4. The computer-implemented method of claim 1, wherein the fling gesture further comprises:
    pressing and holding the access point.

5. The computer-implemented method of claim 1, wherein the off-screen graphical interface window is at least one of a window or a tab.

6. The computer-implemented method of claim 1, wherein the content linked to by the access point is at least one of a web page, a web-based application, an application, a program, a script, an applet, or an executable application.

7. The computer-implemented method of claim 1, wherein the off-screen graphical interface window is generated adjacently to an edge of the display screen towards which the fling gesture was directed.

8. The computer-implemented method of claim 7, further comprising:
    detecting a swipe gesture, wherein the swipe gesture is a movement along a path from a first swipe location in a direction away from said edge of the display screen towards which the fling gesture was directed; and
    displaying the graphical interface window on the display screen in response to detecting the swipe gesture.

9. The method of claim 8, wherein the swipe gesture is performed on the display screen when the graphical interface window is off-screen, wherein the detecting the swipe gesture is in response to the loading, and wherein the swipe gesture is different from the fling gesture.

10. The method of claim 9, wherein a direction of the fling gesture is opposite to a direction of the swipe gesture.

11. The computer-implemented method of claim 7, further comprising detecting a swipe gesture, wherein the swipe gesture causes the off-screen graphical interface window to be displayed on the display screen, wherein the swipe gesture is a movement along a path from a first swipe location on the display screen of the computing device to a second swipe location on the display screen of the computing device, and wherein an angle between (1) the second fling location, (2) an intersection point of a straight line through the first fling location and the second fling location, and a straight line through the first swipe location and the second swipe location, and (3) the second swipe location, is greater than 90 degrees.

12. The method of claim 1, wherein the generating the graphical interface window off-screen comprises:
    refraining from displaying the graphical interface window on the display screen.

13. The method of claim 1, wherein the generated graphical interface window is empty, and wherein the content linked to by the access point is loaded within the empty graphical interface window.

14. A system for generating a graphical interface window for viewing content, the system comprising:
- a memory comprising instructions for generating a graphical interface window for viewing content;
- a processor configured to execute the instructions to:
  - detect a fling gesture performed on an access point, wherein the fling gesture comprises a movement along a path from a first fling location on a display screen of the computing device on the access point to a second fling location on the display screen of the computing device away from the access point, and wherein the access point is a link to content and comprises at least one of a hyperlink, a pointer, an icon, a bookmark, or a shortcut;
  - generate, in response to the detected fling gesture, a graphical interface window off-screen; and
  - load, in response to the generating, the content linked to by the access point within the off-screen graphical interface window.

15. The system of claim 14, wherein the path from the first fling location on the display screen of the computing device on the access point to the second fling location on the display screen of the computing device away from the access point is at least one of a linear path or a non-linear path.

16. The system of claim 14, wherein the fling gesture further comprises:
- pressing and holding the access point.

17. The system of claim 14, wherein the off-screen graphical interface window is at least one of a window or a tab.

18. The system of claim 14, wherein the content linked to by the access point is at least one of a web page, a web-based application, an application, a program, a script, an applet, or an executable application.

19. The system of claim 14, wherein the off-screen graphical interface window is generated adjacently to an edge of the display screen towards which the fling gesture was directed.

20. The system of claim 19, wherein the processor is further configured to execute the instructions to:
- detect a swipe gesture, wherein the swipe gesture is a movement along a path from a first swipe location in a direction away from said edge of the display screen towards which the fling gesture was directed; and
- display the graphical interface window on the display screen in response to detecting the swipe gesture.

21. The system of claim 19, wherein the processor is further configured to execute the instructions to detect a swipe gesture, wherein the swipe gesture causes the off-screen graphical interface window to be displayed on the display screen, and wherein an angle between (1) a straight line through the first fling location and the second fling location, and (2) a straight line through the first swipe location and the second swipe location is greater than 90 degrees.

22. A non-transitory machine-readable storage medium comprising machine readable instructions for causing a processor to execute a method for generating a graphical interface window for viewing content, the method comprising:
- detecting a fling gesture performed on an access point, wherein the fling gesture comprises a movement along a path from a first fling location on a display screen of the computing device on the access point to a second fling location on the display screen of the computing device away from the access point, and wherein the access point is a link to content and comprises at least one of a hyperlink, a pointer, an icon, a bookmark, or a shortcut;
- generating, in response to the detected fling gesture, a graphical interface window off-screen, wherein the off-screen graphical interface window is generated adjacently to an edge of the display screen towards which the fling gesture was directed; and
- loading, in response to the generating, the content linked to by the access point within the off-screen graphical interface window.

* * * * *